July 29, 1941.　　J. W. MEADOWCROFT ET AL　　2,250,645
WELDING ELECTRODE
Filed July 27, 1938

INVENTORS:
JOSEPH W. MEADOWCROFT
CHESTER SCULL
BY John P. Talbot
ATTORNEYS.

Patented July 29, 1941

2,250,645

UNITED STATES PATENT OFFICE 2,250,645

WELDING ELECTRODE

Joseph W. Meadowcroft and Chester Scull, Philadelphia, Pa., assignors to Edward G. Budd Manufacturing Company, Philadelphia, Pa., a corporation of Pennsylvania Application July 27, 1938, Serial No. 221,478

3 Claims. (Cl. 219—4)

This invention relates to electric welding and more particularly to the preparation and construction of welding tips or electrodes used for making electrical connection to work pieces to be electrically spot welded.

The customary practice of making welding electrode tips has involved the forming of the tips by machining from hardened cylindrical copper or copper alloy bar stock. Since the tips are necessarily hollow for the circulation of cooling fluid, considerable material must be cut and drilled away and wasted by this method, and, further, although the metal such as copper may be hard when the cutting commences, it is likely to become heated and to some extent become annealed during the process, thereby producing a welding tip of insufficient hardness to stand up in service. Since a copper having a hardness of substantially seventy Rockwell is employed, the machining is not easily accomplished.

It is, therefore, an object of the present invention to provide a method of making a welding electrode tip without resorting to expensive, slow and wasteful machining operations.

A further object of the invention is to provide a method of making an electrode tip principally by drawing flat stock through dies.

Another object of the invention is to provide a method of hardening the contact tip of a welding electrode which may be of the cold forged or machined type.

And yet another object of the invention is to provide an improved welding tip capable of extended use and long wearing qualities, and capable of having its head hardened by cold working.

Yet a further object is to provide a method of shaping a welding electrode, by a method which simultaneously hardens the material.

The above and other novel features of the invention will appear more fully hereinafter from the following detailed description when taken in conjunction with the accompanying drawing. It is expressly understood, however, that the drawing is employed for purposes of illustration only and is not designed as a definition of the limits of the invention, references being had for this purpose to the appended claims.

In the drawing wherein similar reference characters refer to similar parts throughout the several views.

Figure 1:
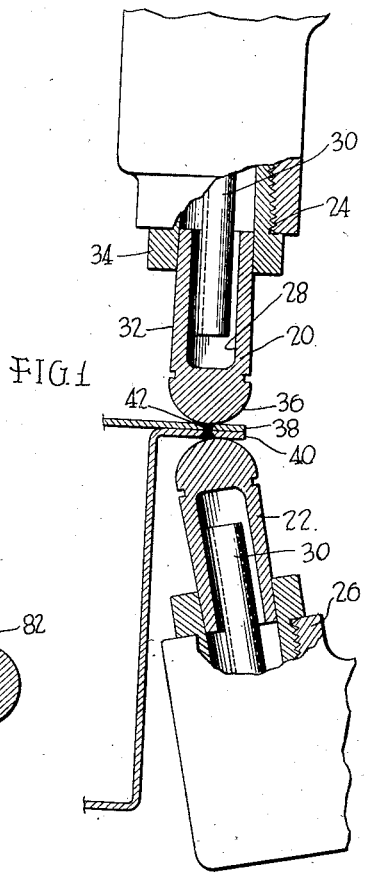
Fig. 1 is a view partly in section through a pair of welding tips produced by the method herein described.

Referring to Fig. 1 in the drawing, there is shown a pair of welding electrodes 20 and 22 held in welding tool sockets 24 and 26. The electrodes are hollow as at 28 and a concentric tube 30 extends well into the hollow to supply cooling liquid within the electrode to counteract the heat resulting from welding. The electrode has a slight taper shown at 32 by which the same is tightly seated in the ferrule 34 of each welding tool socket. The tip is suitably rounded as at 36 to provide proper contact to the metals, for example 38 and 40, which are to be welded at the point 42.

Figure 2:
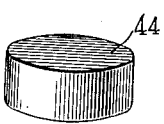
Fig. 2 is a view of the blank from which the tips of Fig. 1 are formed.

To form the electrode, a blank of copper or suitable alloy capable of being drawn, of the approximate size and shape of Fig. 2 is employed, assuming a welding electrode is to be made of approximately the size shown in Fig. 1. The slug 44 may be an inch in diameter and three-eighths of an inch thick, if it is desired to produce a welding electrode of five-eighths of an inch in diameter, of a tip thickness of approximately three-eighths of an inch.

Figure 3:
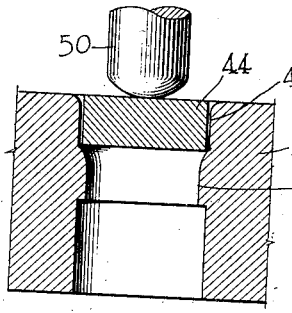
Figs. 3, 4, 5 and 6 are views in section through the dies and punch, showing the various stages in the method.
Figure 4:
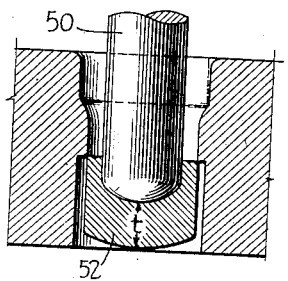
Figure 5:
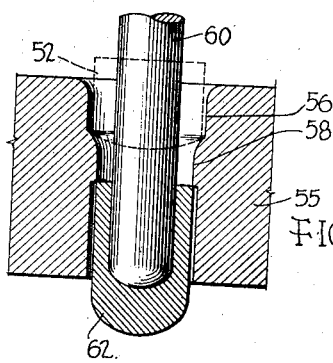

The blank or slug 44 is placed in a die of similar shape to that shown in Fig. 3, the die 45 having a guide portion 46 and a forming portion 48. The blank is pushed through the die as shown in Fig. 4 by the punch 50 and in one operation may be sheared to the intermediate shape shown at 52. It will be observed that the blank thickness $t$ opposite the center of the punch has been retained through this operation. The blank 52 may thereafter be placed in a second die 55 having a centering portion 56 and a forming portion 58 and the partially formed blank 52 is pushed through the die by the punch 60 and is sheared into the shape shown at 62. Thereafter the partially formed electrode 62 may be forced through a third die 65 having a guide portion 66 and forming portion 68 by a punch 70 to emerge in the shape shown at 72. The punch 70 has a specially shaped end 74 which is to a considerable extent flat, merely being rounded at 76 to remove the sharp corners.

It will be understood that soft copper in being worked in this manner becomes hardened to a considerable extent and it may be necessary to anneal the copper before the successive stages to soften it for the succeeding stages in order to prevent danger of cracking or breaking as would be the case should the copper become too hard to draw. It will be observed also that in the process, the tip portion is subjected to the least working of the metal in the slug. In order to provide sufficient hardening of the tip, the same may be mounted upon a pedestal 78 having the same shape as the end of the punch 70 and the tip hammered by a special recessed die 80. In practice, the die is preferably hammered against the tip of the electrode with great rapidity with as many strokes as may be necessary, depending upon the hardness desired and the force of the blow. In welding tips formed by other methods, than that set forth herein, it is customary to drill the center hole 33 which leaves the base of the hole with a conical shape instead of flat. With such electrodes, it would be impossible to harden a tip by hammering in this manner because the pedestal with its conical end would spread the metal causing it to enlarge in diameter and crack the same as soon as any hardness developed.

Figure 8:
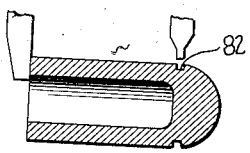
Figs. 8 and 9 illustrate tips in the finishing of the tip.
Figure 9:
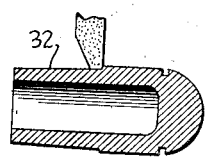

The electrode, after having been hardened by the hammering operation, may be machined as is shown in Figs. 8 and 9, first by cutting a telltale groove 32 whose function is to indicate the amount of wear or loss of metal on the tip, and, secondly, by cutting or grinding a taper on the outer surface so that the electrode will fit tightly within the ferrule 34. The shape of the electrode tip may best be formed during hammering operation by having the recess 81 in the die 80 properly shaped, and thereafter the rough end 83 can be trimmed away. In practice, an electrode of this type is subjected to considerable hammering each time contacts are made to the work pieces to be welded and, consequently, the metal is likely to remain hard regardless of the heating effect of welding and the possible annealing resulting. It will readily appear, though, that should a tip in practice become soft, it may readily be placed in the hammering machine and its shape restored at the same time while the hardness is increased.

Figure 6:
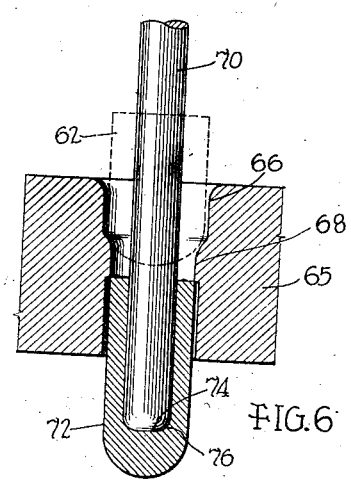
Figure 7:
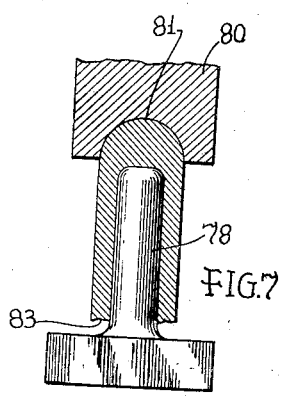
Fig. 7 is a section through a tip positioned between a pedestal and hammering die.

As has been previously pointed out during the shearing operations, it may be necessary to anneal the copper in order to permit the last stages of drawing without injury to the electrode being formed. This to some extent depends upon the speed at which the copper is pushed through the dies, but in practice, it has been found preferable to anneal just prior to the last forming step, illustrated for example in Fig. 6.

There is thus formed by this process a welding electrode which can have its tip hardened to any degree and which is formed with a minimum waste of material as well as from a small number of simple operations capable of being rapidly formed. Comparing this method with that of forming welding electrodes entirely by machining operations, the advantages will be obvious particularly when the hardness of the copper is considered as well as the waste in turnings resulting. Also such machining is likely to heat the electrode during its manufacture causing it to lose some of its hardness and where the cooling hole is bored and left with a conical shape as usually results from such machining operations it would be impossible to harden the tip by the method which forms a part of this invention.

Though only one form of welding electrode has been illustrated and described and only one preferred method of making the same, it is to be understood that the invention is not limited thereto, but may be practiced in the forming of various shaped tips as well as in a varying manner. As many different forms of tips may be constructed by this method as well as the steps varied without departing from the spirit of the invention, as will be apparent to those skilled in the art, reference will be had to the appended claims for a definition of the limits of the invention.

What is claimed is:

1. The method of making a welding electrode of copper which comprises drawing from a flat disc of copper a head and sleeve portion in a plurality of stages, annealing the blank prior to the last drawing stage, and hammering the head portion axially thereafter to increase the hardness thereof.

2. The method of making a welding electrode of copper which comprises drawing from a flat disc of copper having a thickness substantially equal to the desired electrode head thickness, a head having a similar thickness axially and integral sleeve portion in a plurality of stages, and working the head portion thereafter to increase the hardness thereof.

3. The method of hardening a hollow welding electrode tip having a flat bottom recess which comprises hammering said tip in an axial direction between a tip forming die and a flat die adapted to engage the flat bottom of said recess.

JOSEPH W. MEADOWCROFT.
CHESTER SCULL.